United States Patent [19]

Langford, III

[11] Patent Number: 5,106,035
[45] Date of Patent: Apr. 21, 1992

[54] AIRCRAFT PROPULSION SYSTEM USING AIR LIQUEFACTION AND STORAGE

[75] Inventor: John S. Langford, III, Alexandria, Va.

[73] Assignee: Aurora Flight Sciences Corporation, Alexandria, Va.

[21] Appl. No.: 459,254

[22] Filed: Dec. 29, 1989

[51] Int. Cl.$^5$ ............................................. B64D 27/00
[52] U.S. Cl. ................................ 244/59; 244/53 R; 244/62
[58] Field of Search .................. 244/59, 60, 61, 53 R, 244/58, 62; 429/8, 25

[56] References Cited

U.S. PATENT DOCUMENTS 3,748,180  7/1973  Clausi et al. ........................ 429/25
4,697,761  10/1987  Long ................................ 244/53 R

FOREIGN PATENT DOCUMENTS 2197836  6/1988  United Kingdom ................. 244/62

OTHER PUBLICATIONS

Space Plane Grows into Family of Concepts, Larry Booda, Aviation Week, Jun. 19, 1961, pp. 54, 55, 59, 61, 62.

Primary Examiner—Galen Barefoot
Assistant Examiner—Anne E. Bidwell
Attorney, Agent, or Firm—Fitzpatrick, Cella, Harper & Scinto

[57] ABSTRACT

An aircraft propulsion system includes a propeller for propelling the aircraft, an electric motor for driving the propeller, and an electrochemical fuel cell for receiving an oxidizer and providing propulsion power to the electric motor. An air liquefaction system is used for receiving ambient air and providing oxidizer to the fuel cell. Preferably, at low altitude, the air liquefaction system provides oxidizer to the fuel cell and to an oxidizer fuel tank. Then, during high altitude excursions, the oxidizer is provided to the fuel cell from the oxidizer fuel tank. When the oxidizer tank is empty, the aircraft returns to a lower altitude where extraction of oxidizer from the atmosphere is resumed.

24 Claims, 5 Drawing Sheets

AIRCRAFT PROPULSION SYSTEM USING AIR LIQUEFACTION AND STORAGE

BACKGROUND OF THE INVENTION

1. Field of the Invention

The present invention pertains to a propulsion system for an aircraft, and more particularly to method and apparatus for propelling an aircraft using air liquefaction and storage.

The recent discovery of a hole in the ozone layer over Antarctica has stimulated efforts to study the upper atmosphere in Antarctica and around the globe. Such a study entails sampling the atmosphere at a plurality of altitudes from 20 km to 40 km. Currently, balloons and manned aircraft are capable of performing parts of this mission. However, balloons are notoriously difficult to control and their sampling is imprecise and dependent upon the balloon's path. Manned vehicles are very expensive to operate and have many safety constraints, thus reducing the amount of sampling that canbe carried out.

Recently, it has been proposed to utilize a remotely piloted vehicle (RPV) to sample the upper atmosphere in a predictable, organized fashion. The field of RPVs is rather well developed, as in evident by U.S. Pat. No. 3,937,424; U.S. Pat. No. 3,957,230; U.S. Pat. No. 4,415,133; and U.S. Pat. No. 4,697,761. However, all known RPVs are incapable of providing an instrument platform capable of spanning the 20-40 km altitude band, and capable of loitering in the area of interest for a long period of time. This is because known propulsion systems for RPVs include internal combustion engines, gas turbines, batteries, etc. These systems are very heavy, requiring a massive air frame. Further, such systems require storage of on-board fuel, severely limiting the mission duration time.

U.S. Pat. No. 4,415,133 depicts a solar powered RPV which eliminates some of the drawbacks noted above. However, a solar powered RPV will be dependent upon weather conditions, and cannot provide the power necessary to boost an instrument payload to the higher appropriate altitudes.

The fundamental constraint in devising a propulsion system for a high-altitude flight in the earth's atmosphere is the rapid reduction in atmospheric density with altitude. The resulting low pressures at high-altitude makes it difficult to sustain the combustion process typically associated with aircraft propulsion devices. One approach is to fly faster than the speed of sound (supersonic or even hypersonic) and use the ram pressure created in an air inlet to provide sufficient internal pressure to support combustion. However, such supersonic or hypersonic flight would severely restrict the type of atmospheric samples which can be obtained. Thus, atmospheric sampling missions generally require subsonic flight speeds in order to avoid passing atmospheric constituents through a shock wave before they can be sampled.

Previous high-altitude subsonic aircraft (as used herein "high-altitude" refers to altitudes generally exceeding 20 km (65,000 ft)) have used either turbojet propulsion (as in the Lockheed U-2, TR-1, and ER-2 aircraft) or internal combustion with several stages of turbo-machinery to provide the desired inlet air pressure. The most notable example of this is the Teledyne-Continental engine developed for the Boeing Condor, which set an unmanned altitude record of 67,000 ft in 1988.

A variety of unconventional propulsion systems have been proposed. During the 1970's NASA developed an unmanned aircraft called the Mini-Sniffer using a mono-propellant (hydrazine) to achieve altitudes up to 98,000 ft. This program was cancelled before altitudes exceeding 20,000 ft were demonstrated. Electropropulsion systems using solar cells have been proposed, but the current state of the art in the solar cells is such that the power-to-weight ratio severely restricts the wing loadings of available vehicles. Electric propulsion using batteries has been proposed, but the weight of the batteries prohibits operation at high altitudes or long mission durations. Electropropulsion using lithium peroxide fuel cells has been proposed for helicopter-type vehicles (see U.S. Pat. No. 4,709,882). However, since the lithium peroxide cells carry all of the necessary oxygen on board, they are excessively heavy and are unsuitable for long-duration flight.

The 1986 discovery of the Antarctic ozone hole has lead to an increased interest in the chemistry and dynamics of the upper atmosphere. Although existing vehicles such as manned aircraft and unmanned balloons have been pressed into service, the dual requirements of high altitude and long range cannot be met by any existing aircraft or propulsion system. A variety of new scientific missions are under consideration. A typical mission is shown in FIG. 1 and involves cruise ranges on the order of 10,000 km and altitude excursions of up to 40 km.

Thus, what is required in a high-altitude atmosphere-sampling RPV is a propulsion system that offers a range potential in excess of 10,000 km, an altitude potential of up to 40 km, the ability to remain subsonic throughout its mission profile, a non-polluting operation, and sufficient scaling flexibility so that it can be applied to a range of aircraft including small unmanned platforms with payloads of approximately 50 kg to large manned platforms carrying payloads in excess of 1000 kg.

SUMMARY OF THE INVENTION

The present invention provides an aircraft propulsion system satisfying the constraints noted above. The propulsion system preferably includes a fuel cell for generating the propulsion power and an electric motor for driving the propeller. An air liquefaction system is provided for receiving ambient air, liquefying it, storing it, and providing a gaseous oxidizer to the fuel cell. Preferably, when the vehicle is at a lower altitude, ambient air is liquified and used to (1) provide oxidizer to the fuel cell, and (2) store liquid oxidizer in a liquid oxidizer fuel tank. Then, when the vehicle climbs to a thinner atmosphere, oxidizer for the fuel cell is extracted from the liquid oxidizer fuel tank. When the liquid oxidizer fuel tank is empty, the vehicle returns to a lower altitude and once again extracts oxidizer from the thicker atmosphere. This cycle may be repeated any number of times to produce a multiple "pop-up" flight profile as depicted in FIG. 1. The only constraint upon the range of such a vehicle would be the storage capacity of the cryogenic hydrogen fuel also stored on-board.

The air liquefaction system, preferably comprises a compressor-condenser apparatus which condenses the ambient air and liquifies it utilizing the heat capacity of the stored liquid hydrogen. Liquid oxidizer extracted from the atmosphere is then stored in the liquid oxidizer fuel tank, and is provided to the fuel cell. Preferably, the fuel cell is surrounded by a heat exchanger which converts the liquid oxidizer into gaseous oxidizer for use inside the fuel cell simultaneously cooling the fuel cell. The fuel cell outputs electric power which is preferably provided to an electric motor which drives a propeller, thus powering the vehicle.

BRIEF DESCRIPTION OF THE DRAWINGS

The advantageous structure and functions according to the present invention will be more readily understood from the following detailed description of the presently preferred embodiment, when taken together with the drawings in which.

DETAILED DESCRIPTION OF THE PRESENTLY PREFERRED EXEMPLARY EMBODIMENTS

The present invention proposes an efficient aircraft propulsion system featuring a fuel cell which provides higher conversion efficiency of fuel into electricity than internal combustion processes; a high energy cryogenic fuel such as liquid hydrogen, which provides a high ratio of energy per weight, and provides cooling capacity for other systems; an oxidizer reservoir containing sufficient oxidizer in a liquid form so that the system can operate to extremely high altitudes, where operation of a compressor would be prohibitively heavy and inefficient; an air liquefaction system which provides the capability to recharge the oxidizer supply in order to make multiple very high altitude excursions; a pump or compressor to increase the pressure of the oxidizer to levels required for efficient fuel cell operation; an electric motor which has a high energy conversion efficiency and maintains this efficiency through its flight regime; a minimum induced-loss propeller design which provides propulsive efficiencies of approximately 85% even at very high altitudes; and a cooling system used to reject waste heat to the atmosphere.

Figure 3:
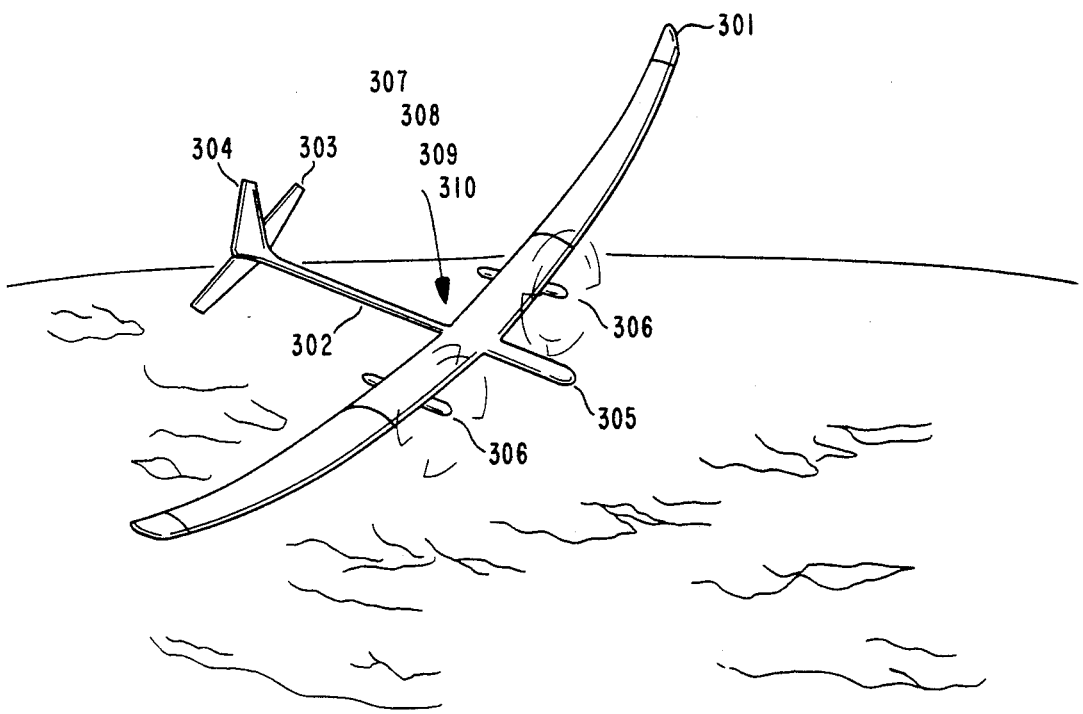
FIG. 3 is a typical aircraft installation of the propulsion system depicted in FIG. 2.

As presently conceptualized, an atmosphere-sampling RPV is depicted in FIG. 3. In FIG. 3, a wing 301 (shown here with a span of 43 m and an area of 61 mz) is provided on a fuselage 302. A horizontal stabilizer 303 and a vertical stabilizer 304 are provided for flight control. A forward payload section 305 provides undisturbed airflow for atmospheric sensors. Twin engine pods 306 contain the propulsion system to be described later. Internal to the aircraft is an autonomous flight control system 307 that features redundant microprocessor controllers 308, a Global Positioning System receiver 309 for accurately determining the location of the vehicle, and a digitized terrain database on laser compact disc 310. The air frame is preferably built of composite materials such as graphite-epoxy and aramid fibers. The gross weight of the system shown is approximately 1000 kg, of which approximately 100 kg is available as payload.

Figure 1:
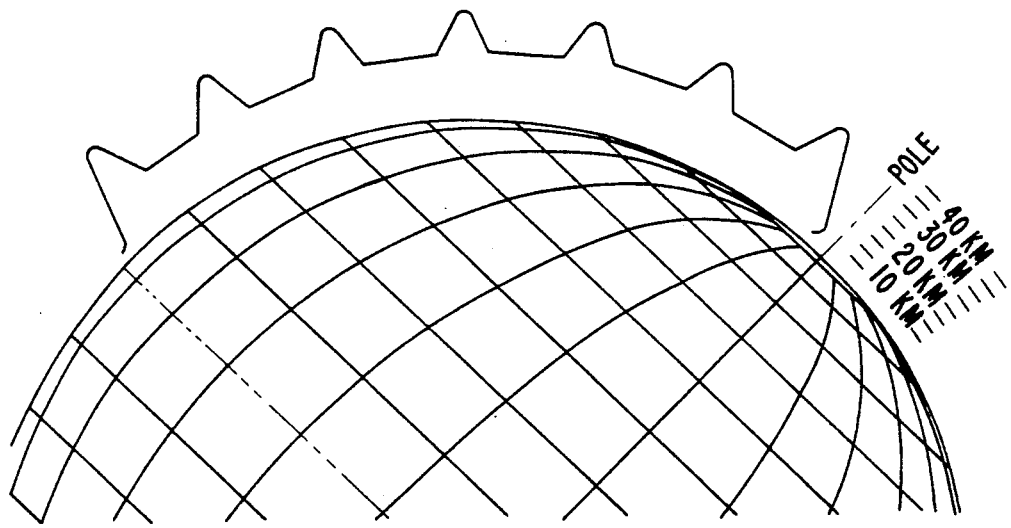
FIG. 1 is a flight profile depicting a typical atmosphere-sampling mission.
Figure 2:
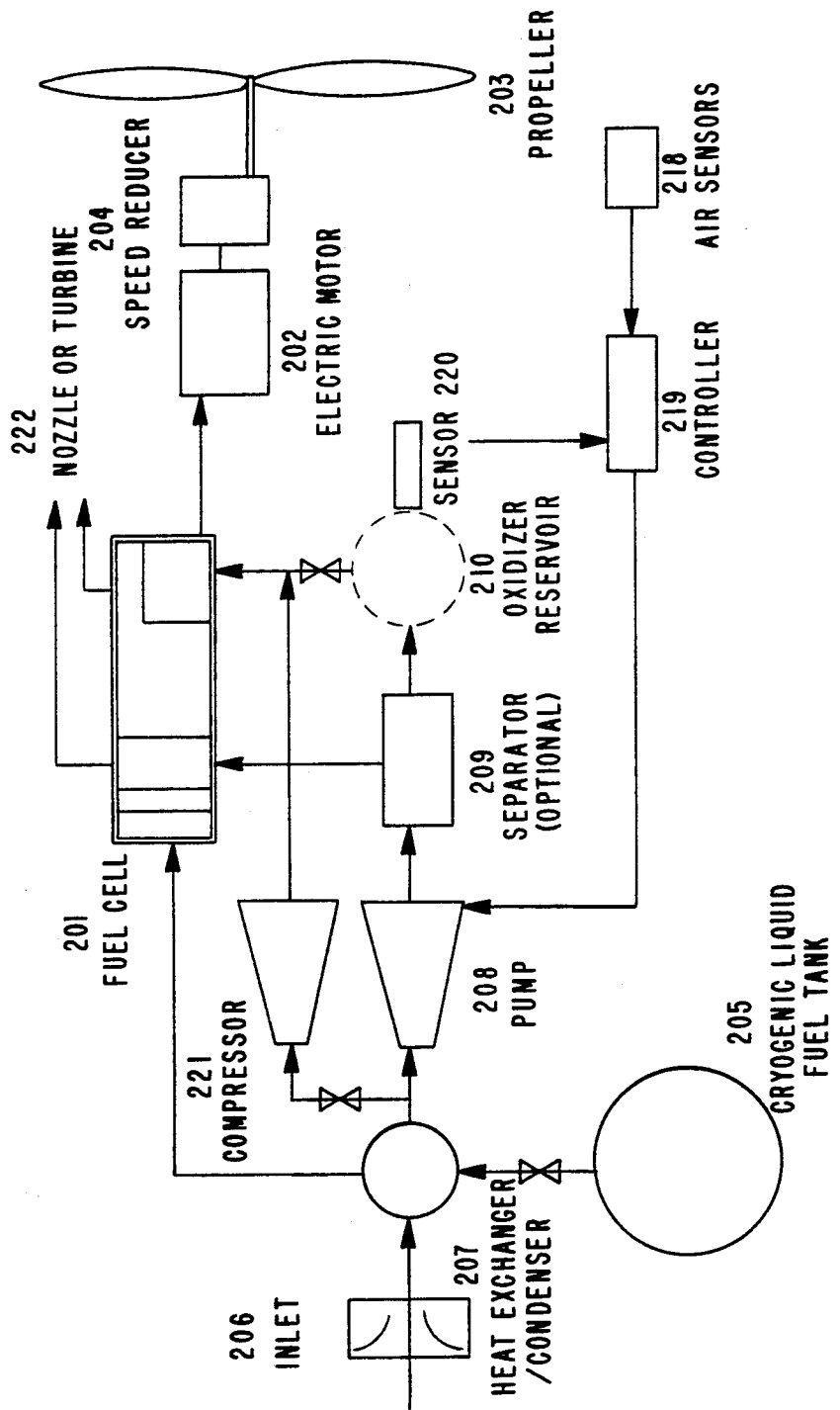
FIG. 2 is a block diagram depicting a first embodiment of the present invention.

FIG. 2 depicts a block diagram of a first embodiment according to the present invention. In FIG. 2, propeller 203 is used to drive the aircraft, and is provided with power from electric motor 202 through speed reducer 204. Motor 202 receives its electric energy from fuel cell 201. Fuel cell 201 may be any of several types of fuel cells such as alkaline, phosphoric acid, solid polymer electrolyte (SPE), etc. The important characteristics are (1) high power-to-weight ratio, and (2) ability to operate on either pure oxygen or atmospheric air. Thus, a cell that is sensitive to $CO_2$ poisoning, such as alkaline, must include an appropriate $CO_2$ scrubber. Each engine pod shown in FIG. 3 includes two 20 kW SPE fuel cells. Fuel cells from International Fuel Cells (a division of United Technologies), Ballard Power Systems, or similar may be used. Gaseous hydrogen at approximately 20° F. is injected into the fuel cell at approximately 50 psi. Oxidizer is also injected at similar conditions.

The fuel cell 201 receives hydrogen from cryogenic liquid fuel tank 205, and oxygen from either oxidizer reservoir 210 or compressor 221. During high-altitude excursions, the oxidizer is taken from oxidizer reservoir 210, while during low-altitude excursions, the oxidizer is extracted from the atmosphere and provided from the compressor 221. Since both the hydrogen and oxidizer must be in gaseous form before entering the fuel cell, the liquid hydrogen and liquid oxidizer are warmed in a heat exchanger to be described below with respect to FIG. 4.

At low altitude, ambient air is received through air inlet 206 and passed through a heat exchanger-condenser 207. In heat exchanger 207, the liquid hydrogen from cryogenic liquid fuel tank 205 is used to condense the oxygen in the ambient air received through inlet 206. A pump 208 then compresses the condensed product and provides liquid air to separator 209. Separator 209 separates out oxygen and nitrogen and produces enriched liquid air (ELAIR). One such separator is described by Nau et.al. in U.S. Pat. No. 3,779,452. The oxygen is used as the oxidizer, while the nitrogen is used to cool the fuel cell and is rejected to the atmosphere through a turbine or nozzle 222. Note that the use of separator 209 is optional since oxygen with nitrogen may be provided to the fuel cell or the oxidizer reservoir 210. Still, use of separator 209 should increase the efficiency of the fuel cell vehicle and reduce the weight of the liquid stored in the reservoir 210.

At low altitudes, the ambient air is used as the source of oxidizer for the fuel cell, and a further amount of oxidizer is supplied to oxidizer reservoir 210. Thus, during the low altitude portion of the mission, the oxidizer reservoir 210 is constantly filled in preparation for high altitude excursions. Since the energy capacity of the liquid hydrogen may not be sufficient to liquefy all of the oxidizer required by the fuel cell, the ambient air at low altitudes is chilled by the heat exchanger 207 and its density is increased. Its pressure is increased by a gas phase compressor 221 for delivery to the fuel cell 201.

FIG. 2 also depicts a control processor 219 and air sensors 218. The air sensors can detect altitude, atmospheric density, pressure, etc. When the air sensors detect that the vehicle is passing above a predetermined threshold, the control processor 219 will shut down pump 208, thus disabling the air liquefaction system. At this point, oxidizer is supplied to the fuel cell from the oxidizer reservoir 210. This continues throughout the high altitude portion of the mission. When sensor 220 detects that the oxidizer reservoir 210 is below a predetermined level, control processor 219 commands the aircraft to proceed to a lower altitude. When the lower altitude is reached, control processor 219 activates pump 208 and compressor 221, thus resuming the extraction of oxidizer from the atmosphere.

Pump 208 and compressor 221 are assumed to be driven by energy extracted from fuel cell 201. However, an alternative would be to use self-contained units which incorporate their own power source such as a turbine driven by a separate hydrogen flow.

Sensor 220 may be a flow meter, a weight meter, or a level detector. Further, the vehicle should be commanded to a lower altitude while some amount of oxidizer remains in reservoir 210 in order that the aircraft may maintain powered, controlled flight until the lower altitude is reached.

Further, while the present invention includes a fuel cell, it would be possible to use an internal combustion engine or other light-weight power system capable of utilizing an oxidizer. Those having skill in this field will readily understand the wide variety of power sources that can be adapted to the present invention.

Figure 4A:
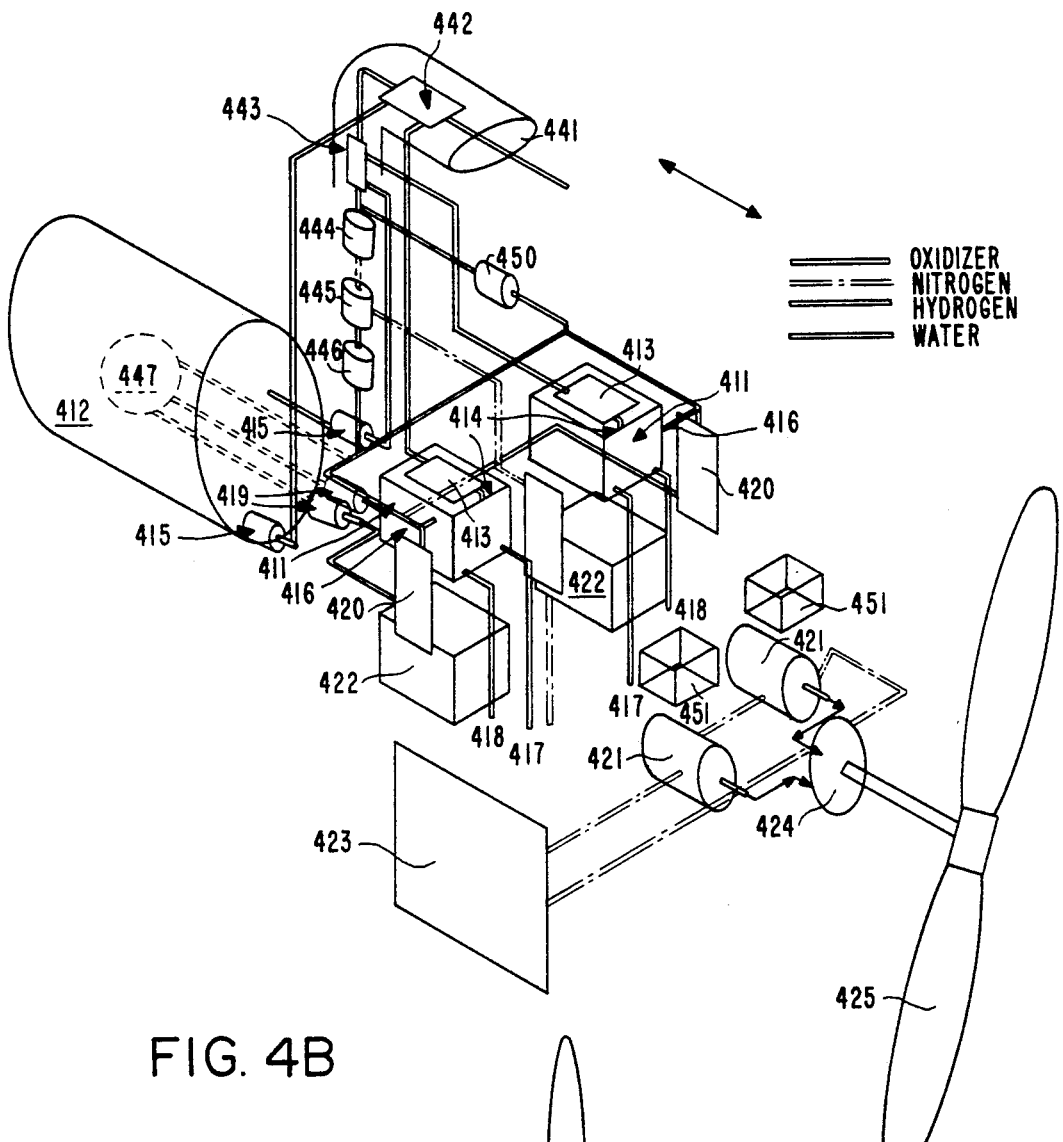
FIG. 4 is a detailed design of one possible system.
Figure 4B:
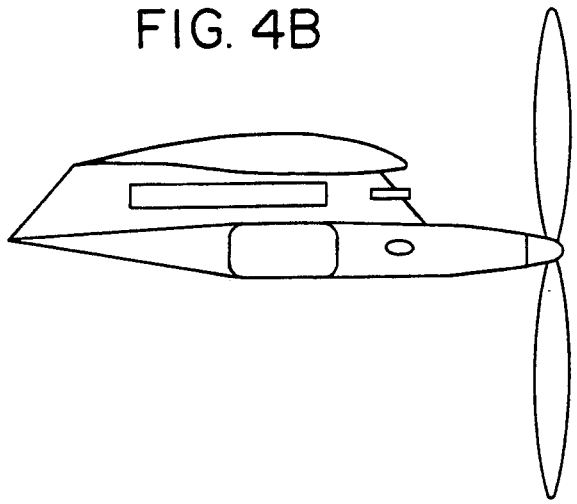

FIG. 4 depicts an exploded view of a typical aircraft installation, for example, an installation in one of the motor pods 306 from FIG. 3. In FIG. 4, two fuel cells are depicted at 411, and the output from the fuel cells is provided to two 20 kW UNIQ motors 421. The preferred 20 kW electric motors are produced by Unique Mobility of Englewood, CO. These units operate on approximately 100 V and 200 A, using inverters 422 to convert the direct current provided by the fuel cells to the three-phase alternating current required to drive the motor. The shafts rotate at approximately 6000-7500 rpm. The motors are cooled with a circulating fluid pumped through a radiator system 423. A planetary gear box 424 is used to merge the mechanical power output from the motors and to provide it to propeller 425. The gear box and its bearings are sealed and cooled by the same recirculating system used to cool the motor.

The propeller 425 is a variable-pitch propeller approximately 8 m in diameter using minimum-induced loss algorithms. At an altitude of 30 km, it turns at 580 rpm and has a conversion efficiency of 85%. It is constructed of composite materials and has a variable-pitch hub. The gear box has three speeds to allow precise matching of propeller and motor speeds throughout the flight regime.

The fuel cell requires a gaseous oxidizer at a pressure far above ambient. During the cruise mode (low-altitude), this pressure can be obtained through the compressor (probably operating with an intercooler). The baseline design shown in FIG. 4 uses a liquid-phase compression. Incoming air is decelerated through an inlet 41 and then passed over a precooler 442, and a condenser 43. These heat exchangers consist of small, stainless steel tubes through which cryogenic hydrogen is passed. The system is sized to collect primarily oxygen, but due to the close liquefaction temperatures of oxygen (90° K) and nitrogen (77° K), this will inevitably include a significant fraction of nitrogen. The pressure of this liquid is raised with a low pressure pump 444. Depending on the type of fuel in use, a separator 445 may be used to further enrich the oxygen flow. The resulting fluid is then transferred with a high pressure pump 446 into a storage tank 447. In the installation shown in FIG. 4, the oxidizer tank 447 is nested inside the liquid hydrogen tank 412 to reduce insulation weight requirements. Since the oxidizer flow required by the fuel cells exceeds the liquefaction capacity of the hydrogen flow, the remaining air (chilled but not liquefied) is compressed in a compressor 450 before being fed into the fuel cell 411.

Liquid hydrogen pumps 415 are used to pump liquid hydrogen from tank 412 to heat exchangers 413 disposed on the fuel cell. Thus, the fuel cell can be cooled and gaseous hydrogen can be provided to the fuel cell. Likewise, liquid oxygen pumps 419 pump liquid oxygen from tank 447 to heat exchangers 420. Again, these exchangers extract heat from the fuel cells and provide gaseous oxidizer thereto.

Heat will be rejected from this aircraft system from (1) the fuel cell (approximately 35% of installed power), (2) the motor and drive train (approximately 10% of installed power), and (3) the pump or compressor (approximately 25% of installed power). A cooling system capable of handling this heat load is required. In the system depicted in FIG. 4, the installed power is approximately 40 kW. This heat rejection is handled in three ways:

(1) by preheating the liquid oxidizer and converting it to the gaseous form required by the fuel cell;
(2) by using the heating capacity of the separated nitrogen;
(3) by utilizing any cooling capacity of the liquid hydrogen not used by the air liquefaction cycle (i.e., during the "pop-up" mode when the air liquefaction system is not in use).

Any cooling capacity not available from the cryogenic fuel is provided through a recirculating fluid rejecting heat to the atmosphere through a radiator 423 built into the pylon and/on wing skin.

Figure 5:
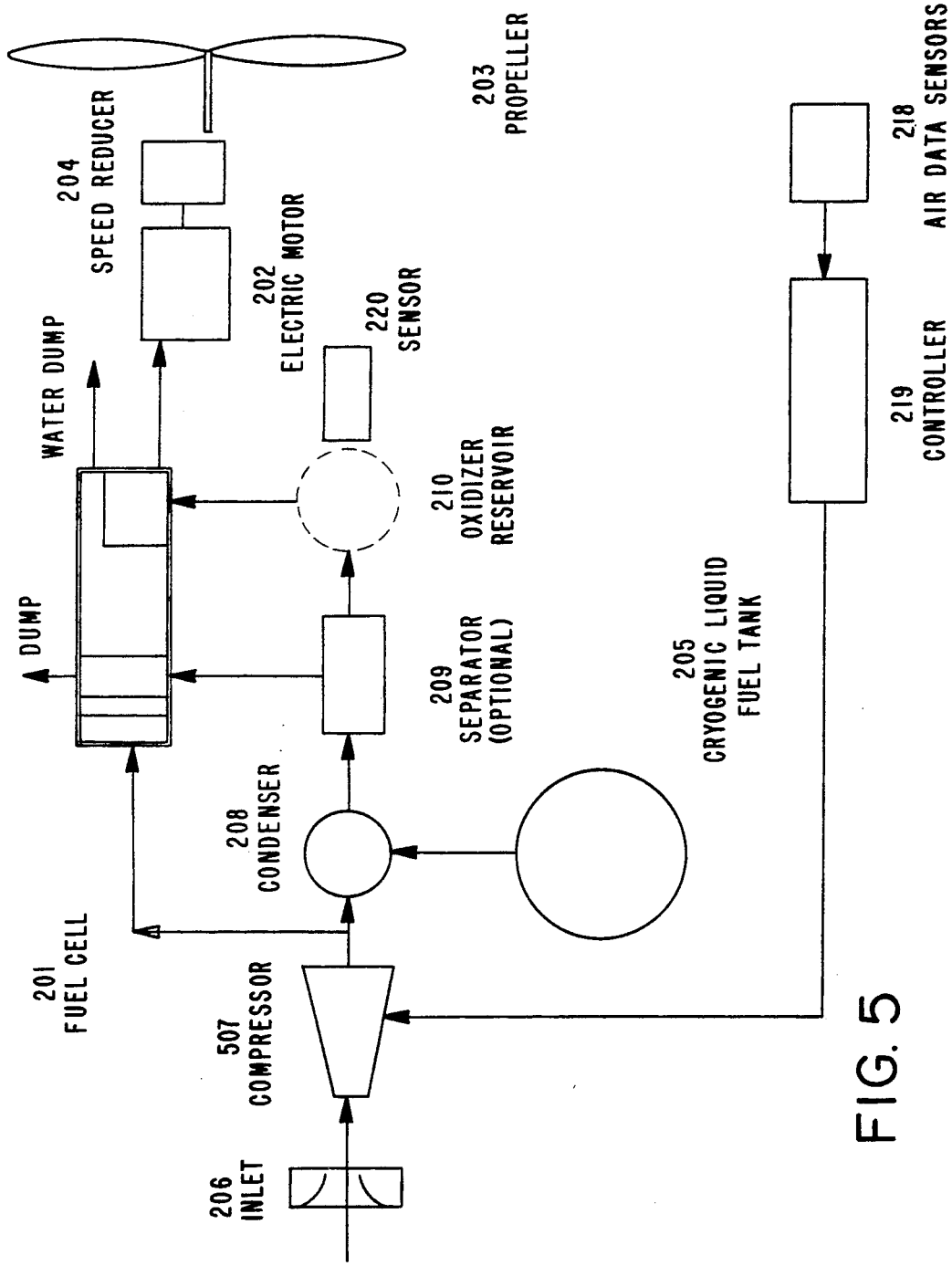
FIG. 5 is a block diagram of a second embodiment according to the present invention.

A second embodiment of the present invention is depicted in FIG. 5. According to this embodiment, air is compressed while still in the gas phase by a compressor 507. This can be either radial flow, axial flow, or positive displacement type depending on the mass flow required by the specific installation. Due to the high compression ratios required at cruise altitudes, a multistage compressor using intercooling will probably be required. Upon exiting the compressor, the mass flow is split with one portion being fed directly into the fuel cell 201, and the other portion being directed to the air liquefaction system 208. As before, a separator 209 may be installed to reduce the nitrogen content of the oxidizer before storing it in a reservoir tank 210. According to the FIG. 5 embodiment, compressed ambient air is provided directly to the fuel cell 201 without it being condensed by condenser 208. The remaining structure and the operation of the FIG. 5 embodiment are substantially similar to the FIG. 2 embodiment.

Thus, what has been described is a light-weight, efficient, recyclable propulsion system featuring the extraction of oxidizer from the atmosphere and the storage of oxidizer for use during high-altitude excursions. While this invention has been described with what are presently believed to be the most practical and preferred embodiments, it is to be understood that the appended claims are intended to cover various structural and functional equivalents thereof. Therefore, the appended claims are to be accorded the broadest scope commensurate with the disclosed invention.

I claim:
1. An aircraft propulsion system, comprising:
propeller means for propelling the aircraft;
an electric motor for driving said propeller means;

an electrochemical fuel cell for receiving an oxidizer and providing propulsion power to said electric motor;

an air liquefaction system for receiving ambient air, and providing a liquid oxidizer to said fuel cell, said air liquefaction system including (a) a condenser for condensing the ambient air, (b) a compressor for compressing the ambient air, and (c) an oxidizer tank for storing the liquid oxidizer; and control means for causing liquid oxidizer from said oxidizer tank to be provided to said fuel cell only when the aircraft is above a predetermined altitude.

2. A system according to claim 1 wherein said fuel cell includes a heat exchanger to convert the liquid oxidizer to a gaseous oxidizer.

3. A system according to claim 1 wherein said propeller means comprises a propeller.

4. A system according to claim 1 further comprising fuel supply means for providing a fuel to said fuel cell.

5. A system according to claim 4 wherein said fuel supply means includes:
a fuel tank for storing said fuel; and
supply means for supplying said fuel from said fuel tank, through said condenser, to said fuel cell.

6. A system according to claim 5 further comprising:
altitude sensor means, coupled to said control means, for detecting when the aircraft reaches said predetermined altitude; and
oxidizer sensor means, coupled to said control means, for detecting an amount of oxidizer in said oxidizer tank;
and wherein said control means causes said compressor to cease compressing when the aircraft is above said predetermined altitude, and causes the aircraft to descend when said oxidizer sensor means detects that the amount of oxidizer in said oxidizer tank is below a predetermined threshold.

7. Apparatus for propelling an aircraft, comprising:
a power generator for receiving a first fuel and a second fuel and outputting propulsion power;
a first fuel tank for storing said first fuel;
a second fuel tank for storing said second fuel;
a pump for compressing ambient air and providing said second fuel to said power generator and to said second fuel tank;
control means for causing said second fuel to be provided to said power generator from said pump when the aircraft is below a predetermined altitude, and for causing said second fuel tank when the aircraft is above said predetermined altitude; and
a sensor for detecting an amount of fuel in said second fuel tank, and wherein said control means causes the aircraft to descend when the amount of fuel in said second fuel tank falls below a predetermined threshold.

8. Apparatus according to claim 7 wherein said power generator includes:
a fuel cell; and
an electric motor.

9. Apparatus according to claim 7 further comprising a heat exchanger, coupled to said first fuel tank, for cooling said ambient air with fuel from said first fuel tank.

10. Apparatus according to claim 9 further comprising a separator, coupled to said power generator, for separating nitrogen and oxygen from the compressed, cooled ambient air, and for providing the oxygen to said second fuel tank, and for providing the nitrogen to said power generator.

11. Apparatus according to claim 7 wherein said first fuel comprises hydrogen, and said second fuel comprises oxygen.

12. Apparatus for propelling a high-altitude, aircraft, comprising:
a fuel cell for receiving an oxidizer and providing propulsion power;
an oxidizer tank for storing said oxidizer;
compressor/condenser means for receiving ambient air and compressing/condensing it to provide said oxidizer to said fuel cell and to said oxidizer tank;
control means for causing the oxidizer stored in said oxidizer tank to be provided to said fuel cell when the aircraft exceeds a predetermined altitude; and
an oxidizer tank sensor, and wherein said control means causes the aircraft to descend when the amount of oxidizer in said oxidizer tank falls below a predetermined threshold.

13. Apparatus according to claim 12 wherein said control means causes the oxidizer from said compressor/condenser means to be provided to said fuel cell when the aircraft is below the predetermined altitude.

14. Apparatus according to claim 12 further comprising:
a fuel tank for storing fuel to be used by said fuel cell;
fuel supply means for supplying fuel from said fuel tank to said fuel cell through said compressor/condenser means where the fuel is used to condense the ambient air.

15. Apparatus according to claim 12 wherein said compressor/condenser means comprises a pump and a heat exchanger.

16. Apparatus according to claim 15 wherein said pump receives drive power from said fuel cell.

17. Propulsion apparatus for a high-altitude, subsonic aircraft, comprising:
an electrochemical fuel cell for receiving gaseous hydrogen and gaseous oxygen and providing propulsion power;
a liquid hydrogen fuel tank for storing liquid hydrogen;
a liquid oxygen fuel tank for storing liquid oxygen;
an air inlet for receiving ambient air;
compressor/condenser means, coupled to said liquid hydrogen fuel tank for (1) condensing the received ambient air using liquid hydrogen from said liquid hydrogen fuel tank, (2) compressing the received ambient air, (3) providing liquid oxidizer to said liquid oxidizer fuel tank, and (4) providing compressed air to said fuel cell;
a sensor for detecting the amount of liquid oxygen in said liquid oxygen tank;
a first heat exchanger for converting the liquid hydrogen from said compressor/condenser means into gaseous hydrogen and providing same to said fuel cell;
a second heat exchanger for converting the liquid oxygen from said liquid oxygen tank into gaseous oxygen and providing same to said fuel cell;
an altitude sensor; and
control means for (1) causing compressed air to be provided to said fuel cell from said compressor/condenser means when the aircraft is below a predetermined altitude, (2) causing liquid oxygen to be provided to said second heat exchanger from said liquid oxygen tank when the aircraft is above said predetermined altitude, and (3) causing the aircraft to descend below said predetermined altitude when the amount of liquid oxygen in said liquid oxygen tank falls below a predetermined threshold.

18. A process for propelling an aircraft comprising the steps of:
providing propulsion power from a power generator;
storing power generator fuel in a fuel tank;
receiving ambient air;
compressing nd condensing the ambient air with a condenser/compressor apparatus to provide a liquid oxidizer;
sending the liquid oxidizer and the fuel from the fuel tank to said power generator;
detecting the altitude of the aircraft;
storing liquid oxidizer in an oxidizer tank;
causing the liquid oxidizer in said oxidizer tank to be provided to said power generator when the aircraft is above a predetermined altitude;
causing the liquid oxidizer to be provided to said power generator from said condenser/compressor apparatus when the aircraft is below the predetermined altitude;
detecting the amount of liquid oxidizer in said oxidizer tank; and
causing the aircraft to descend when the amount of liquid oxidizer in said oxidizer tank falls below a predetermined threshold.

19. A method for propelling an aircraft, comprising the steps of:
receiving a first fuel and a second fuel in a fuel cell and providing propulsion power;
storing the first fuel in a first fuel tank;
storing the second fuel in a second fuel tank;
compressing ambient air with a pump and providing the second fuel to the fuel cell and to the second fuel tank;
detecting an altitude of the aircraft;
causing the second fuel to be provided to the fuel cell from a pump when the aircraft is below a predetermined altitude, and causing the second fuel to be provided to the fuel cell from the second fuel when the aircraft is above the predetermined altitude;
detecting an amount of second fuel remaining in said second fuel; and
causing the aircraft to descend when the amount of second fuel remaining in said second fuel tank falls below a predetermined threshold.

20. A method according to claim 19 further including the step of causing the pump to cease compressing the ambient air when the aircraft passes above the predetermined altitude.

21. A method according to claim 19 wherein said first fuel comprises hydrogen, and said second fuel comprises oxygen.

22. A process for propelling a high-altitude, aircraft, comprising the steps of:

providing an oxidizer to a fuel cell which provided propulsion power for said aircraft;
storing the oxidizer in an oxidizer tank;
receiving ambient air;
compressing and condensing the ambient air to provide said oxidizer to said fuel cell and to said oxidizer tank;
causing the oxidizer in the oxidizer tank to be provided to the fuel cell when the aircraft exceeds a predetermined altitude;
sensing an amount of oxidizer remaining in said oxidizer tank; and
causing the aircraft to descend below the predetermined altitude when the amount of oxidizer in said oxidizer tank falls below a predetermined threshold.

23. A method according to claim 22 further including the steps of:
providing a fuel to said fuel cells;
storing said fuel in a fuel tank;
using the fuel from said fuel tank in said compressing and condensing step.

24. A process of propelling a high-altitude, subsonic aircraft, comprising the steps of:
providing gaseous hydrogen and gaseous oxygen to an electrochemical fuel cell which provides propulsion power for said aircraft;
storing liquid hydrogen in a liquid hydrogen fuel tank;
storing liquid oxygen in a liquid oxygen fuel tank;
receiving ambient air through an air inlet;
compressing and condensing the received ambient air using liquid hydrogen from the liquid hydrogen fuel tank and a compressor/condenser apparatus;
providing liquid oxygen to the liquid oxygen fuel tank from said compressor/condenser;
providing compressed air to said fuel cell from said compressor/condenser;
detecting an amount of liquid oxygen in said liquid oxygen tank;
converting the liquid hydrogen from said compressor/condenser into gaseous hydrogen and providing same to said fuel cell;
converting the liquid oxygen from said liquid oxygen tank into gaseous oxygen and providing same to said fuel cells;
detecting an altitude of said aircraft;
causing compressed air to be provided from said compressor/condenser when the aircraft is below a predetermined altitude;
causing liquid oxygen to be provided from said liquid oxygen tank when the aircraft is above the predetermined altitude;
causing the aircraft to descend below the predetermined altitude when the amount of liquid oxygen in the liquid oxygen tank falls below a predetermined threshold.

* * * * *